(12) United States Patent
Chen et al.

(10) Patent No.: US 11,418,123 B2
(45) Date of Patent: Aug. 16, 2022

(54) POWER SUPPLY APPARATUS SUPPRESSING TRANSIENT VOLTAGE

(71) Applicant: P-DUKE TECHNOLOGY CO., LTD., Taichung (TW)

(72) Inventors: Lien-Hsing Chen, Taichung (TW); Ta-Wen Chang, Taichung (TW); Liang-Jhou Dai, Taichung (TW); Chien-Hsiung Huang, Taichung (TW)

(73) Assignee: P-DUKE TECHNOLOGY CO, LTD., Taichung (TW)

( * ) Notice: Subject to any disclaimer, the term of this patent is extended or adjusted under 35 U.S.C. 154(b) by 0 days.

(21) Appl. No.: 17/114,542

(22) Filed: Dec. 8, 2020

(65) Prior Publication Data

US 2022/0181983 A1 Jun. 9, 2022

(51) Int. Cl.
*H02M 3/335* (2006.01)
*H02M 1/32* (2007.01)
(Continued)

(52) U.S. Cl.
CPC .......... *H02M 3/33576* (2013.01); *G05F 3/18* (2013.01); *H02H 9/04* (2013.01); *H02M 1/32* (2013.01); *H02M 1/0025* (2021.05)

(58) Field of Classification Search
CPC ............ H02M 3/00; H02M 3/22; H02M 3/24; H02M 3/325; H02M 3/335; H02M 3/33507; H02M 3/33515; H02M 3/33523; H02M 3/3353; H02M 3/33538; H02M 3/33546; H02M 3/33553; H02M 3/33569;
(Continued)

(56) References Cited

U.S. PATENT DOCUMENTS 6,301,133 B1 10/2001 Cuadra et al.
8,816,664 B2 8/2014 Fujii et al.
(Continued)

FOREIGN PATENT DOCUMENTS

CN 104852584 A 8/2015
CN 106992671 A 7/2017
(Continued)

OTHER PUBLICATIONS

Office Action of corresponding German patent application No. 102020134008.7 dated Jul. 22, 2021.
(Continued)

*Primary Examiner* — Thienvu V Tran
*Assistant Examiner* — Carlos O Rivera-Perez
(74) *Attorney, Agent, or Firm* — Bacon & Thomas, PLLC

(57) ABSTRACT

A power supply apparatus (10) suppressing a transient voltage is applied to an input voltage (50). The power supply apparatus (10) includes a power supply circuit (20), a feedback signal generation circuit (30) and a feedback signal control circuit (40). If the power supply circuit (20) stops receiving the input voltage (50), the feedback signal control circuit (40) controls the feedback signal generation circuit (30) to discharge so that the feedback signal generation circuit (30) controls the power supply circuit (20) to decrease an output voltage (60), so that when the power supply circuit (20) receives the input voltage (50) again, the power supply circuit (20) avoids generating an output overvoltage condition for the output voltage (60).

7 Claims, 2 Drawing Sheets

(51) Int. Cl.
*G05F 3/18* (2006.01)
*H02H 9/04* (2006.01)
*H02M 1/00* (2006.01)

(58) Field of Classification Search
CPC ......... H02M 3/33571; H02M 3/33573; H02M 3/33576; H02M 3/33584; H02M 3/33592; H02M 1/0003; H02M 1/0006; H02M 1/0025; H02M 1/0032; H02M 1/0035; H02M 1/32; H02M 1/322; H02M 1/325; H02M 1/36; G05F 3/00; G05F 3/02; G05F 3/08; G05F 3/16; G05F 3/18; G05F 3/185; H02H 9/00; H02H 9/005; H02H 9/04–06
USPC ........ 363/15–21.18, 49, 50–56.12, 106, 109; 323/266, 271–276, 281–287, 299–303, 323/304, 311, 312, 313, 351, 901, 902; 361/18, 56, 59–61, 88–92, 111
See application file for complete search history.

(56) References Cited

U.S. PATENT DOCUMENTS

| | | | |
|---|---|---|---|
| 10,615,681 | B2 | 4/2020 | Nonaka et al. |
| 2009/0185397 | A1 | 7/2009 | Forghani-Zadeh et al. |
| 2014/0375227 | A1 | 12/2014 | Yoshinaga |
| 2015/0070945 | A1* | 3/2015 | Huang ................ H02H 7/1213 363/21.16 |

FOREIGN PATENT DOCUMENTS

| | | |
|---|---|---|
| TW | I614975 B | 2/2018 |
| TW | 201820755 A | 6/2018 |
| TW | M607174 U | 2/2021 |

OTHER PUBLICATIONS

Taiwanese Office Action of the corresponding Taiwan patent application No. 109133163 dated Apr. 12, 2021.

* cited by examiner

POWER SUPPLY APPARATUS SUPPRESSING TRANSIENT VOLTAGE

BACKGROUND OF THE INVENTION

Field of the Invention

The present invention relates to a power supply apparatus, and especially relates to a power supply apparatus which suppresses a transient voltage.

Description of the Related Art

A related art power supply circuit receives an input voltage to convert the input voltage into an output voltage. The related art power supply circuit can utilize a related art feedback signal generation circuit to feedback control the output voltage. Usually, the related art feedback signal generation circuit may include a related art operational amplifier and a related art reference voltage source. The related art operational amplifier is electrically connected to the related art reference voltage source. The related art operational amplifier compares a dividing voltage of the output voltage with a reference voltage of the related art reference voltage source to feedback control the output voltage. Therefore, the related art power supply circuit can generate the stable output voltage.

If the related art power supply circuit stops receiving the input voltage, the related art feedback signal generation circuit detects that the output voltage decreases, so that the related art feedback signal generation circuit controls the related art power supply circuit to request the related art power supply circuit to increase the output voltage. If the related art operational amplifier still works to request the related art power supply circuit to increase the output voltage during the related art power supply circuit stops receiving the input voltage, when the related art power supply circuit receives the input voltage again, the output voltage generates an output overvoltage condition, especially when the related art power supply circuit is in a light load condition or in no load condition.

SUMMARY OF THE INVENTION

In order to solve the above-mentioned problems, an object of the present invention is to provide a power supply apparatus which suppresses a transient voltage.

In order to achieve the object of the present invention mentioned above, the power supply apparatus of the present invention is applied to an input voltage. The power supply apparatus includes a power supply circuit, a feedback signal generation circuit and a feedback signal control circuit. The feedback signal generation circuit is electrically connected to the power supply circuit. The feedback signal control circuit is electrically connected to the power supply circuit and the feedback signal generation circuit. Moreover, if the power supply circuit stops receiving the input voltage, the feedback signal control circuit controls the feedback signal generation circuit to discharge so that the feedback signal generation circuit controls the power supply circuit to decrease an output voltage, so that when the power supply circuit receives the input voltage again, the power supply circuit avoids generating an output overvoltage condition for the output voltage.

Moreover, in an embodiment of the power supply apparatus of the present invention mentioned above, the power supply circuit includes an auxiliary voltage generation sub-circuit electrically connected to the feedback signal control circuit.

Moreover, in an embodiment of the power supply apparatus of the present invention mentioned above, the feedback signal control circuit includes a voltage detection sub-circuit electrically connected to the auxiliary voltage generation sub-circuit.

Moreover, in an embodiment of the power supply apparatus of the present invention mentioned above, the feedback signal control circuit further includes a voltage adjustment sub-circuit electrically connected to the power supply circuit, the feedback signal generation circuit, and the voltage detection sub-circuit. Moreover, if the power supply circuit stops receiving the input voltage, the voltage detection sub-circuit detects that the auxiliary voltage generation sub-circuit stops generating an auxiliary voltage, and the voltage detection sub-circuit informs the voltage adjustment sub-circuit that the auxiliary voltage generation sub-circuit stops generating the auxiliary voltage, so that the voltage adjustment sub-circuit controls the feedback signal generation circuit to discharge.

Moreover, in an embodiment of the power supply apparatus of the present invention mentioned above, the feedback signal generation circuit includes a reference voltage source electrically connected to the voltage adjustment sub-circuit. Moreover, when the voltage adjustment sub-circuit controls the feedback signal generation circuit to discharge, the voltage adjustment sub-circuit outputs a low voltage to the reference voltage source, so that the reference voltage source stops working.

Moreover, in an embodiment of the power supply apparatus of the present invention mentioned above, the voltage detection sub-circuit includes a first Zener diode and a first resistor. The first Zener diode is electrically connected to the auxiliary voltage generation sub-circuit and the voltage adjustment sub-circuit. The first resistor is electrically connected to the first Zener diode and the voltage adjustment sub-circuit.

Moreover, in an embodiment of the power supply apparatus of the present invention mentioned above, the voltage adjustment sub-circuit includes a first diode, a second diode and a second resistor. The first diode is electrically connected to the first Zener diode and the first resistor. The second diode is electrically connected to the first diode and the reference voltage source. The second resistor is electrically connected to the feedback signal generation circuit, the first diode and the second diode.

Moreover, in an embodiment of the power supply apparatus of the present invention mentioned above, the feedback signal generation circuit further includes an operational amplifier and a feedback sub-circuit. The operational amplifier is electrically connected to the reference voltage source and the second resistor. The feedback sub-circuit is electrically connected to the operational amplifier and the power supply circuit. Moreover, the operational amplifier includes an operational amplifier output end, an operational amplifier inverting input end and an operational amplifier non-inverting input end. The operational amplifier output end is electrically connected to the feedback sub-circuit. The operational amplifier non-inverting input end is electrically connected to the reference voltage source.

Moreover, in an embodiment of the power supply apparatus of the present invention mentioned above, the feedback signal generation circuit further includes a first voltage division resistor and a second voltage division resistor. The first voltage division resistor is electrically connected to the power supply circuit, the second resistor, the operational amplifier inverting input end and the feedback sub-circuit. The second voltage division resistor is electrically connected to the first voltage division resistor and the operational amplifier inverting input end. Moreover, when the reference voltage source stops working, a first voltage of the operational amplifier non-inverting input end is less than a first dividing voltage between the first voltage division resistor and the second voltage division resistor, so that the operational amplifier controls the power supply circuit through the operational amplifier output end and the feedback sub-circuit to decrease the output voltage.

Moreover, in an embodiment of the power supply apparatus of the present invention mentioned above, the power supply circuit further includes a pulse width modulation control sub-circuit, a power switch, a transformer, a rectification filtering circuit, and an output end capacitor. The pulse width modulation control sub-circuit is electrically connected to the feedback sub-circuit. The power switch is electrically connected to the pulse width modulation control sub-circuit. The transformer is electrically connected to the power switch and the auxiliary voltage generation sub-circuit. The rectification filtering circuit is electrically connected to the transformer, the feedback sub-circuit, the first voltage division resistor and the second resistor. The output end capacitor is electrically connected to the first voltage division resistor, the second resistor, the rectification filtering circuit, and the feedback sub-circuit.

The advantage of the present invention is that if the feedback signal generation circuit still works during the power supply circuit stops receiving the input voltage, when the power supply circuit receives the input voltage again, the power supply circuit can avoid generating the output overvoltage condition. Moreover, in an embodiment of the present invention, the advantage of the present invention is that if the operational amplifier still works during the power supply circuit stops receiving the input voltage, when the power supply circuit receives the input voltage again, the power supply circuit can avoid generating the output overvoltage condition, especially when the power supply circuit is in a light load condition or in no load condition. Moreover, if the operational amplifier still works during the power supply circuit stops receiving the input voltage, the operational amplifier is forced to control the pulse width modulation control sub-circuit through the operational amplifier output end and the feedback sub-circuit to decrease the output voltage.

Please refer to the detailed descriptions and figures of the present invention mentioned below for further understanding the technology, method and effect of the present invention achieving the predetermined purposes. It believes that the purposes, characteristic and features of the present invention can be understood deeply and specifically. However, the figures are only for references and descriptions, but the present invention is not limited by the figures.

DETAILED DESCRIPTION OF THE INVENTION

Figure 1:
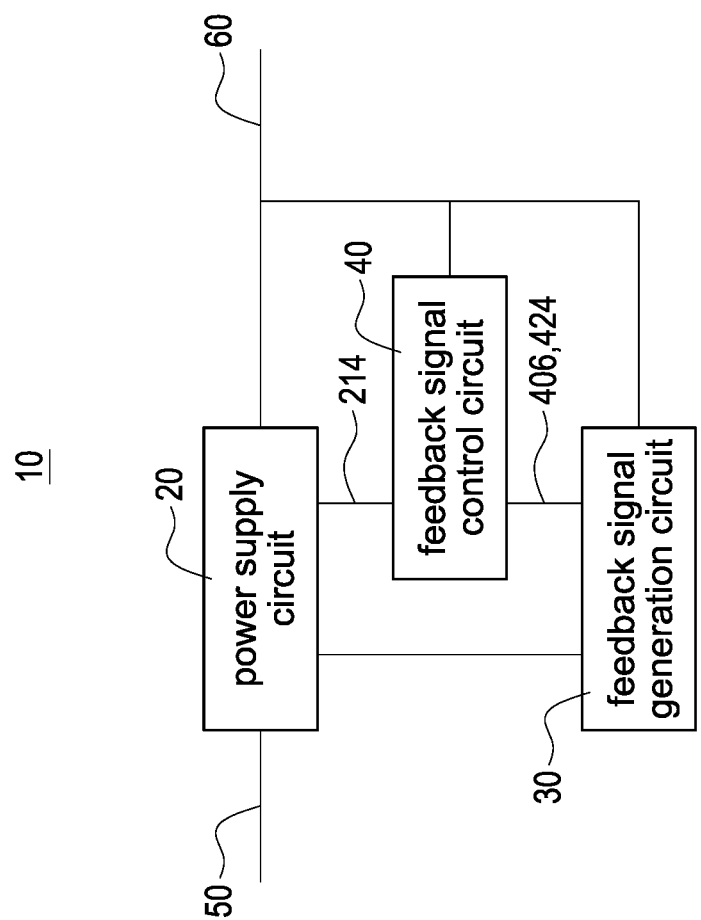
FIG. 1 shows a block diagram of the first embodiment of the power supply apparatus of the present invention.

In the present disclosure, numerous specific details are provided, to provide a thorough understanding of embodiments of the invention. Persons of ordinary skill in the art will recognize, however, that the present invention can be practiced without one or more of the specific details. In other instances, well-known details are not shown or described to avoid obscuring aspects of the present invention. Now please refer to the figures for the explanation of the technical content and the detailed description of the present invention:

FIG. 1 shows a block diagram of the first embodiment of the power supply apparatus of the present invention. A power supply apparatus 10 of the present invention suppressing a transient voltage is applied to an input voltage 50. The power supply apparatus 10 includes a power supply circuit 20, a feedback signal generation circuit 30 and a feedback signal control circuit 40. The components mentioned above are electrically connected to each other. If the power supply circuit 20 stops receiving the input voltage 50, the feedback signal control circuit 40 controls the feedback signal generation circuit 30 to discharge so that the feedback signal generation circuit 30 controls the power supply circuit 20 to decrease an output voltage 60, so that when the power supply circuit 20 receives the input voltage 50 again, the power supply circuit 20 avoids generating an output overvoltage condition for the output voltage 60.

Moreover, the input voltage 50 may be a direct current voltage or an alternating current voltage. The power supply circuit 20 converts the input voltage 50 into the output voltage 60. The power supply circuit 20 is, for example but not limited to, a power supply. The feedback signal generation circuit 30 detects the output voltage 60 to control the power supply circuit 20 to feedback control the output voltage 60. The feedback signal generation circuit 30 is, for example but not limited to, a feedback signal generator. The feedback signal control circuit 40 is, for example but not limited to, a feedback signal controller. The power supply circuit 20 stopping receiving the input voltage 50 mentioned above is, for example but not limited to, the input voltage 50 being cut off.

Moreover, the feedback signal control circuit 40 detects an auxiliary voltage 214 provided by the power supply circuit 20. If the auxiliary voltage 214 exists (namely, the power supply circuit 20 receives the input voltage 50; the input voltage 50 is not cut off; the feedback signal control circuit 40 receives the auxiliary voltage 214), the feedback signal control circuit 40 generates a high voltage 424 and sends the high voltage 424 to the feedback signal generation circuit 30, so that the feedback signal generation circuit 30 works normally (namely, the feedback signal generation circuit 30 detects the output voltage 60 to control the power supply circuit 20 to feedback control the output voltage 60). If the auxiliary voltage 214 does not exist (namely, the power supply circuit 20 stops receiving the input voltage 50; the input voltage 50 is cut off; the feedback signal control circuit 40 stops receiving the auxiliary voltage 214), the feedback signal control circuit 40 generates a low voltage 406 and sends the low voltage 406 to the feedback signal generation circuit 30, so that the feedback signal generation circuit 30 discharges, to avoid requesting the power supply circuit 20 to increase the output voltage 60.

Figure 2:
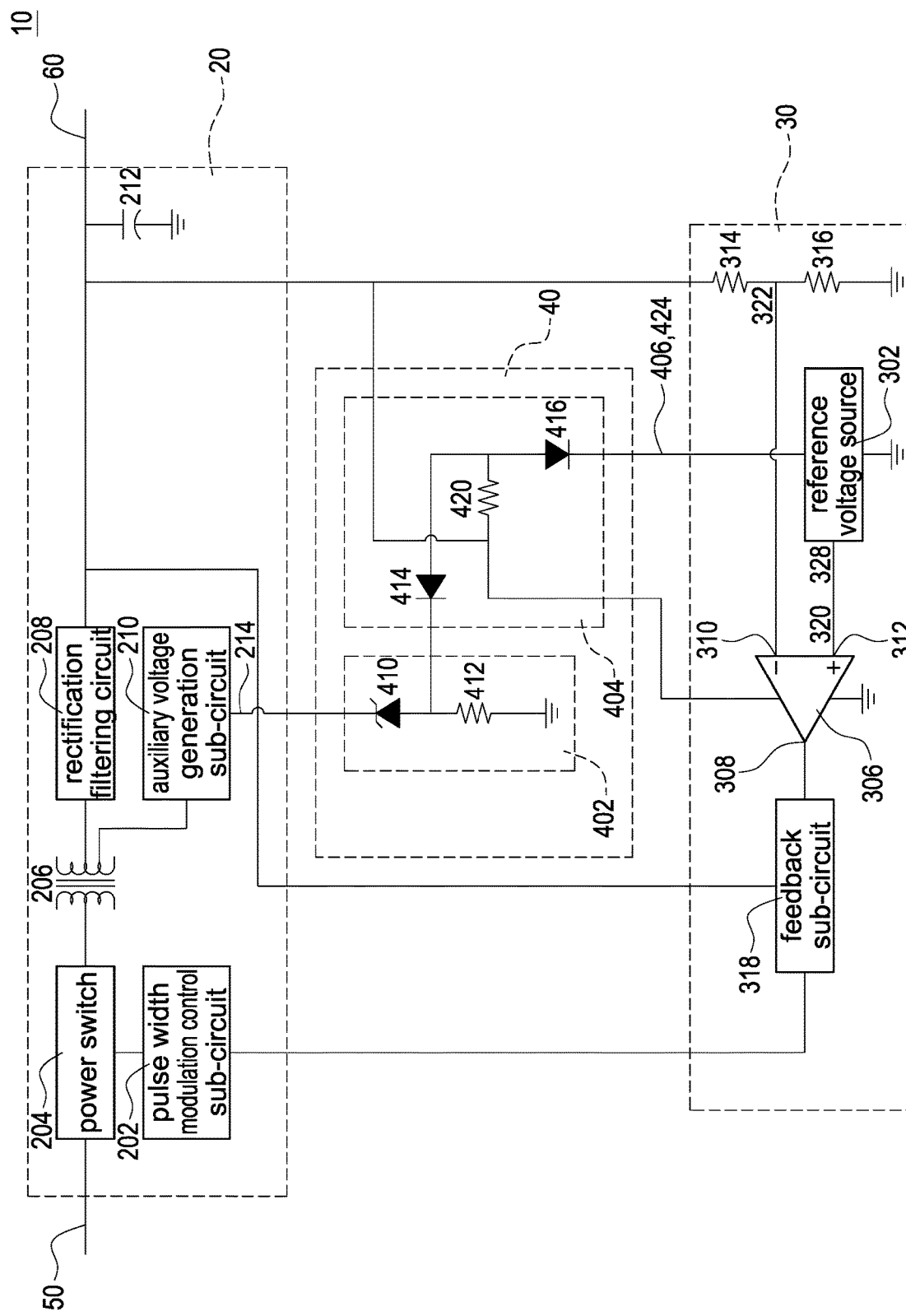
FIG. 2 shows a block diagram of the second embodiment of the power supply apparatus of the present invention.

FIG. 2 shows a block diagram of the second embodiment of the power supply apparatus of the present invention. The descriptions of the elements shown in FIG. 2 which are the same as the elements shown in FIG. 1 are not repeated here for brevity. The power supply circuit 20 includes a pulse width modulation control sub-circuit 202, a power switch 204, a transformer 206, a rectification filtering circuit 208, an auxiliary voltage generation sub-circuit 210 and an output end capacitor 212. The feedback signal generation circuit 30 includes a reference voltage source 302, the operational amplifier 306, a first voltage division resistor 314, a second voltage division resistor 316 and a feedback sub-circuit 318. The feedback signal control circuit 40 includes a voltage detection sub-circuit 402 and a voltage adjustment sub-circuit 404. The operational amplifier 306 includes an operational amplifier output end 308, an operational amplifier inverting input end 310 and an operational amplifier non-inverting input end 312. The voltage detection sub-circuit 402 includes a first Zener diode 410 and a first resistor 412. The voltage adjustment sub-circuit 404 includes a first diode 414, a second diode 416 and a second resistor 420. The components mentioned above are electrically connected to each other.

If the power supply circuit 20 stops receiving the input voltage 50, the voltage detection sub-circuit 402 detects that the auxiliary voltage generation sub-circuit 210 stops generating the auxiliary voltage 214, and the voltage detection sub-circuit 402 informs the voltage adjustment sub-circuit 404 that the auxiliary voltage generation sub-circuit 210 stops generating the auxiliary voltage 214, so that the voltage adjustment sub-circuit 404 outputs the low voltage 406 to the reference voltage source 302, so that the reference voltage source 302 stops working and a first voltage 320 of the operational amplifier non-inverting input end 312 is less than a first dividing voltage 322 between the first voltage division resistor 314 and the second voltage division resistor 316, so that the operational amplifier 306 controls the power supply circuit 20 through the operational amplifier output end 308 and the feedback sub-circuit 318 to decrease the output voltage 60.

Moreover, if the power supply circuit 20 stops receiving the input voltage 50:

> An anode voltage of the first diode 414=[the output voltage 60×a first resistance value of the first resistor 412/(the first resistance value of the first resistor 412+a second resistance value of the second resistor 420)]+a first barrier voltage of the first diode 414

> The low voltage 406=the anode voltage of the first diode 414−a second barrier voltage of the second diode 416=[the output voltage 60×the first resistance value of the first resistor 412/(the first resistance value of the first resistor 412+the second resistance value of the second resistor 420)]+the first barrier voltage of the first diode 414−the second barrier voltage of the second diode 416

If the first barrier voltage of the first diode 414 is equal to the second barrier voltage (for example, 0.7 volt) of the second diode 416:

> The low voltage 406=the output voltage 60×the first resistance value of the first resistor 412/(the first resistance value of the first resistor 412+the second resistance value of the second resistor 420)

Moreover, the reference voltage source 302 is, for example but not limited to, a Zener diode, a buck integrated circuit, a constant current source circuit or a voltage division circuit which is similar to the voltage division circuit which includes the first voltage division resistor 314 and the second voltage division resistor 316. The first resistor 412 and the second resistor 420 may be designed properly (for example, the first resistance value of the first resistor 412 is smaller), so that the low voltage 406 is small enough so that the reference voltage source 302 stops providing a reference voltage 328 to the operational amplifier non-inverting input end 312 (namely, the reference voltage source 302 mentioned above stops working). If the power supply circuit 20 stops receiving the input voltage 50, the output voltage 60 mentioned above is provided by the output end capacitor 212 and decreases gradually.

Moreover, if the power supply circuit 20 receives the input voltage 50, the voltage detection sub-circuit 402 detects that the auxiliary voltage generation sub-circuit 210 generates the auxiliary voltage 214, and the voltage detection sub-circuit 402 informs the voltage adjustment sub-circuit 404 that the auxiliary voltage generation sub-circuit 210 generates the auxiliary voltage 214, so that the voltage adjustment sub-circuit 404 outputs the high voltage 424 to the reference voltage source 302, so that the reference voltage source 302 provides the reference voltage 328 to the operational amplifier non-inverting input end 312, so that the operational amplifier 306 can work normally.

Moreover, if the power supply circuit 20 receives the input voltage 50:

> A first across voltage of the first resistor 412=the auxiliary voltage 214−a second across voltage of the first Zener diode 410

> The anode voltage of the first diode 414=the first across voltage of the first resistor 412+the first barrier voltage of the first diode 414=the auxiliary voltage 214−the second across voltage of the first Zener diode 410+the first barrier voltage of the first diode 414

> The high voltage 424=the anode voltage of the first diode 414−the second barrier voltage of the second diode 416=the auxiliary voltage 214−the second across voltage of the first Zener diode 410+the first barrier voltage of the first diode 414−the second barrier voltage of the second diode 416

If the first barrier voltage of the first diode 414 is equal to the second barrier voltage (for example, 0.7 volt) of the second diode 416:

> The high voltage 424=the auxiliary voltage 214−the second across voltage of the first Zener diode 410

For example, if the auxiliary voltage 214 is 10 volts, and if the second across voltage (namely, the breakdown voltage) of the first Zener diode 410 is 7.5 volts, then the high voltage 424 is 2.5 volts. If the reference voltage source 302 is a Zener diode with the breakdown voltage 1.25 volts, the high voltage 424 (2.5 volts) which is mentioned above and is sent to the reference voltage source 302 will result that the reference voltage source 302 provides the reference voltage 328 (1.25 volts) to the operational amplifier non-inverting input end 312, so that the operational amplifier 306 can work normally.

Moreover, the operational amplifier 306 being able to work normally mentioned above means that if the first voltage 320 of the operational amplifier non-inverting input end 312 is less than the first dividing voltage 322 between the first voltage division resistor 314 and the second voltage division resistor 316, the operational amplifier 306 controls the pulse width modulation control sub-circuit 202 through the operational amplifier output end 308 and the feedback sub-circuit 318 to decrease a conduction rate of the power switch 204 to decrease the output voltage 60; if the first voltage 320 of the operational amplifier non-inverting input end 312 is greater than the first dividing voltage 322 between the first voltage division resistor 314 and the second voltage division resistor 316, the operational amplifier 306 controls the pulse width modulation control sub-circuit 202 through the operational amplifier output end 308 and the feedback sub-circuit 318 to increase the conduction rate of the power switch 204 to increase the output voltage 60.

Moreover, one end of the first Zener diode 410 is connected to the auxiliary voltage generation sub-circuit 210. The other end of the first Zener diode 410 is connected to the voltage adjustment sub-circuit 404. One end of the first resistor 412 is connected to the voltage adjustment sub-circuit 404 and the other end of the first Zener diode 410. The other end of the first resistor 412 is connected to ground. One end of the first diode 414 is connected to the other end of the first Zener diode 410 and one end of the first resistor 412. One end of the second diode 416 is connected to the other end of the first diode 414. The other end of the second diode 416 is connected to the reference voltage source 302. One end of the second resistor 420 is connected to the feedback signal generation circuit 30. The other end of the second resistor 420 is connected to the other end of the first diode 414 and one end of the second diode 416.

The advantage of the present invention is that if the feedback signal generation circuit 30 still works during the power supply circuit 20 stops receiving the input voltage 50, when the power supply circuit 20 receives the input voltage 50 again, the power supply circuit 20 can avoid generating the output overvoltage condition. Moreover, in an embodiment of the present invention, the advantage of the present invention is that if the operational amplifier 306 still works during the power supply circuit 20 stops receiving the input voltage 50, when the power supply circuit 20 receives the input voltage 50 again, the power supply circuit 20 can avoid generating the output overvoltage condition, especially when the power supply circuit 20 is in a light load condition or in no load condition. Moreover, if the operational amplifier 306 still works during the power supply circuit 20 stops receiving the input voltage 50, the operational amplifier 306 is forced to control the pulse width modulation control sub-circuit 202 through the operational amplifier output end 308 and the feedback sub-circuit 318 to decrease the output voltage 60.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power supply apparatus (10) suppressing a transient voltage and applied to an input voltage (50), the power supply apparatus (10) comprising:
a power supply circuit (20);
a feedback signal generation circuit (30) electrically connected to the power supply circuit (20); and
a feedback signal control circuit (40) electrically connected to the power supply circuit (20) and the feedback signal generation circuit (30),
wherein if the power supply circuit (20) stops receiving the input voltage (50), the feedback signal control circuit (40) is configured to control the feedback signal generation circuit (30) to discharge so that the feedback signal generation circuit (30) is configured to control the power supply circuit (20) to decrease an output voltage (60), so that when the power supply circuit (20) receives the input voltage (50) again, the power supply circuit (20) is configured to avoid generating an output overvoltage condition for the output voltage (60);
wherein:
the power supply circuit (20) comprises an auxiliary voltage generation sub-circuit (210) electrically connected to the feedback signal control circuit (40);
the feedback signal control circuit (40) comprises a voltage detection sub-circuit (402) electrically connected to the auxiliary voltage generation sub-circuit (210); and
the feedback signal control circuit (40) further comprises a voltage adjustment sub-circuit (404) electrically connected to the power supply circuit (20), the feedback signal generation circuit (30) and the voltage detection sub-circuit (402), wherein if the power supply circuit (20) stops receiving the input voltage (50), the voltage detection sub-circuit (402) is configured to detect that the auxiliary voltage generation sub-circuit (210) stops generating an auxiliary voltage (214), and the voltage detection sub-circuit (402) is configured to inform the voltage adjustment sub-circuit (404) that the auxiliary voltage generation sub-circuit (210) stops generating the auxiliary voltage (214), so that the voltage adjustment sub-circuit (404) is configured to control the feedback signal generation circuit (30) to discharge.

2. The power supply apparatus (10) in claim 1, wherein the feedback signal generation circuit (30) comprises a reference voltage source (302) electrically connected to the voltage adjustment sub-circuit (404), wherein when the voltage adjustment sub-circuit (404) controls the feedback signal generation circuit (30) to discharge, the voltage adjustment sub-circuit (404) is configured to output a low voltage (406) to the reference voltage source (302), so that the reference voltage source (302) is configured to stop working.

3. The power supply apparatus (10) in claim 2, wherein the voltage detection sub-circuit (402) comprises:
a first zener diode (410) electrically connected to the auxiliary voltage generation sub-circuit (210) and the voltage adjustment sub-circuit (404); and
a first resistor (412) electrically connected to the first zener diode (410) and the voltage adjustment sub-circuit (404).

4. The power supply apparatus (10) in claim 3, wherein the voltage adjustment sub-circuit (404) comprises:
a first diode (414) electrically connected to the first zener diode (410) and the first resistor (412);
a second diode (416) electrically connected to the first diode (414) and the reference voltage source (302); and
a second resistor (420) electrically connected to the feedback signal generation circuit (30), the first diode (414) and the second diode (416).

5. The power supply apparatus (10) in claim 4, wherein the feedback signal generation circuit (30) further comprises:
an operational amplifier (306) electrically connected to the reference voltage source (302) and the second resistor (420); and
a feedback sub-circuit (318) electrically connected to the operational amplifier (306), the power supply circuit (20) and the second resistor (420),
wherein the operational amplifier (306) comprises an operational amplifier output end (308), an operational amplifier inverting input end (310) and an operational amplifier non-inverting input end (312), wherein the operational amplifier output end (308) is electrically connected to the feedback sub-circuit (318), wherein the operational amplifier non-inverting input end (312) is electrically connected to the reference voltage source (302).

6. The power supply apparatus (10) in claim 5, wherein the feedback signal generation circuit (30) further comprises:

a first voltage division resistor (314) electrically connected to the power supply circuit (20), the second resistor (420), the operational amplifier inverting input end (310) and the feedback sub-circuit (318); and a second voltage division resistor (316) electrically connected to the first voltage division resistor (314) and the operational amplifier inverting input end (310), wherein when the reference voltage source (302) stops working, a first voltage (320) of the operational amplifier non-inverting input end (312) is less than a first dividing voltage (322) between the first voltage division resistor (314) and the second voltage division resistor (316), so that the operational amplifier (306) is configured to control the power supply circuit (20) through the operational amplifier output end (308) and the feedback sub-circuit (318) to decrease the output voltage (60).

7. The power supply apparatus (10) in claim 6, wherein the power supply circuit (20) further comprises:

a pulse width modulation control sub-circuit (202) electrically connected to the feedback sub-circuit (318);

a power switch (204) electrically connected to the pulse width modulation control sub-circuit (202);

a transformer (206) electrically connected to the power switch (204) and the auxiliary voltage generation sub-circuit (210);

a rectification filtering circuit (208) electrically connected to the transformer (206), the feedback sub-circuit (318), the first voltage division resistor (314) and the second resistor (420); and an output end capacitor (212) electrically connected to the first voltage division resistor (314), the second resistor (420), the rectification filtering circuit (208) and the feedback sub-circuit (318).

* * * * *